Nov. 19, 1929.                P. JENSEN                1,736,498
                    PARKING DEVICE FOR AUTOMOBILES
                       Filed May 21, 1928        2 Sheets-Sheet 1
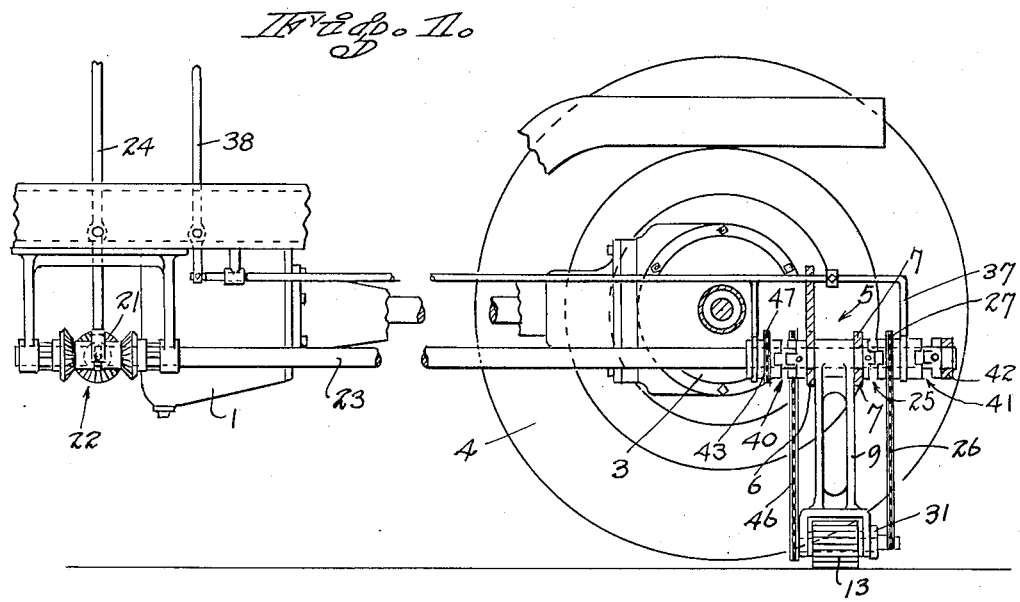
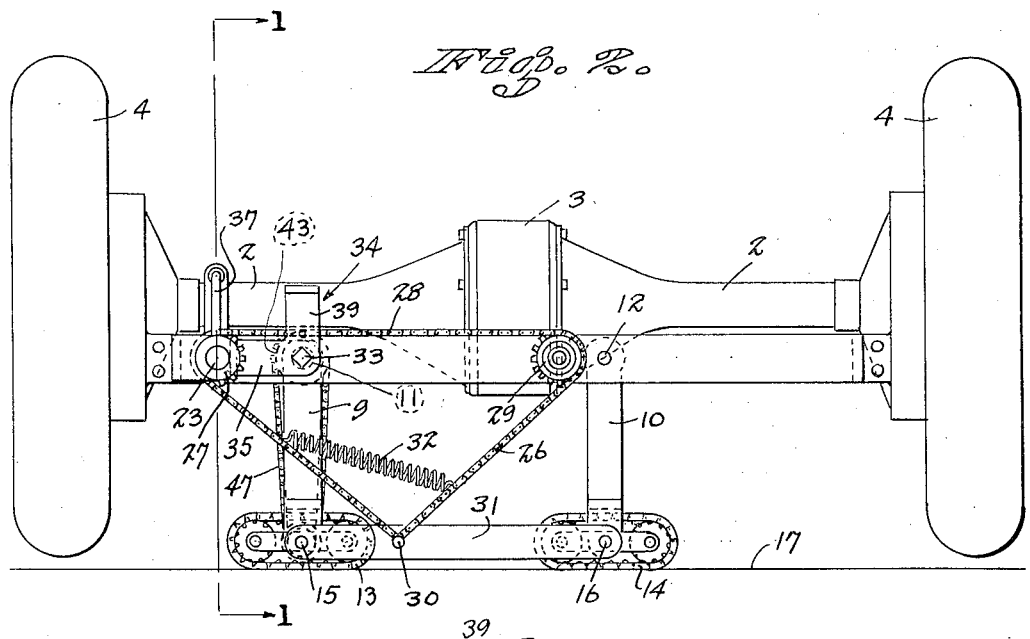
INVENTOR.
PETER JENSEN
BY
ATTORNEYS.

Nov. 19, 1929.    P. JENSEN    1,736,498
PARKING DEVICE FOR AUTOMOBILES
Filed May 21, 1928    2 Sheets-Sheet 2
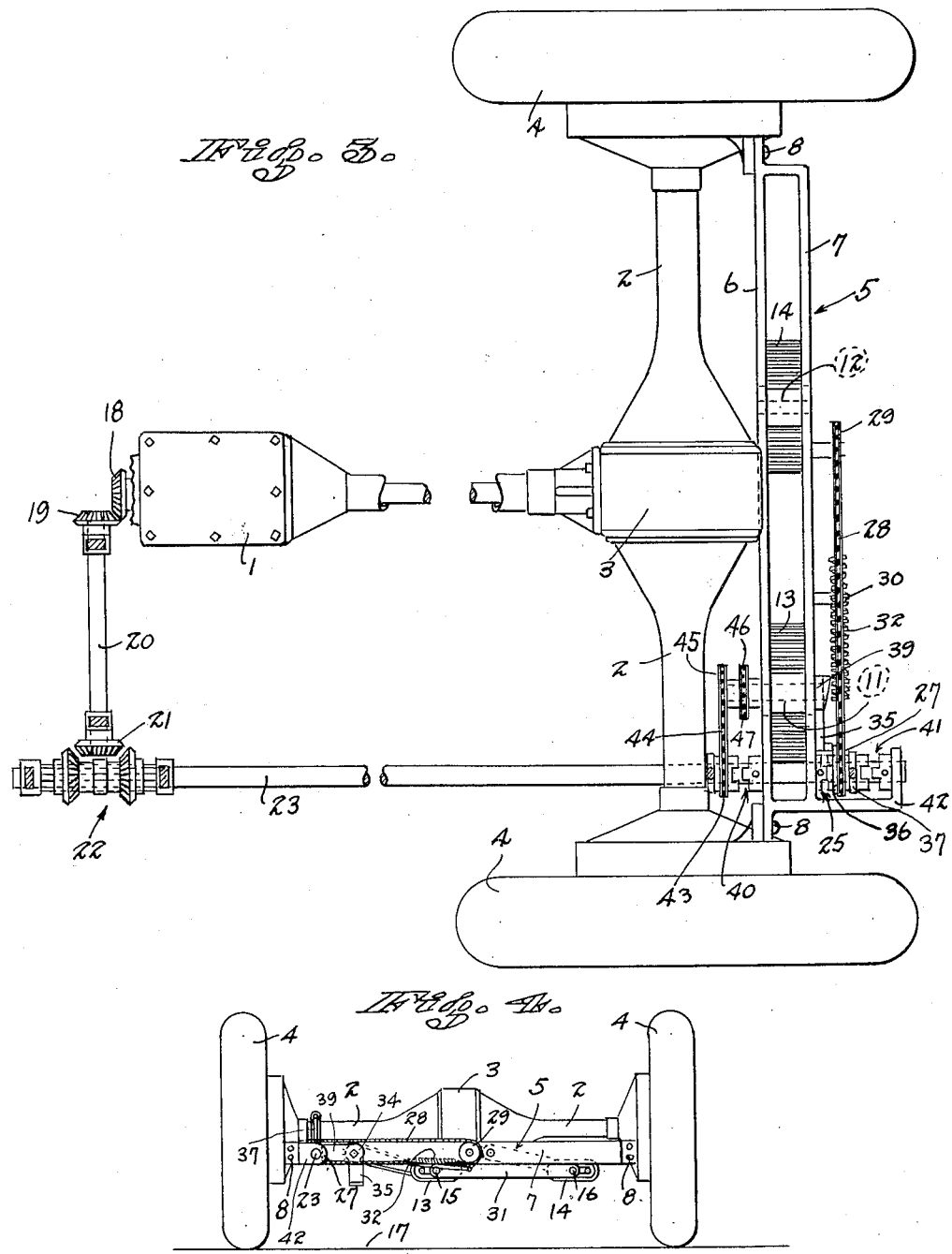
INVENTOR.
PETER JENSEN
BY 
ATTORNEYS.

Patented Nov. 19, 1929

1,736,498

UNITED STATES PATENT OFFICE

PETER JENSEN, OF DALY CITY, CALIFORNIA

PARKING DEVICE FOR AUTOMOBILES

Application filed May 21, 1928. Serial No. 279,529.

My invention relates to improvements in parking devices for automobiles, and it consists in the combinations, constructions, and arrangements hereinafter described and claimed.

An object of my invention is to provide a parking device for automobiles which will enable the car to be parked in a space but slightly longer than the length of the car. The device makes use of auxiliary wheels or endless rail-laying belts which are disposed at the rear axle housing and are mounted so as to be dropped into operative position for moving the rear of the car transversely in either direction. The engine of the automobile is used for this purpose, and the auxiliary car-moving members are connected to or disconnected from the engine at the will of the operator. The device may also be used as a jack for raising the rear wheels when it is desired to change a tire.

A further object of my invention is to provide a device of the type described which may be attached to a standard automobile with but slight alterations being made in the latter.

Other objects and advantages will appear as the specification proceeds, and the novel features of the device will be particularly pointed out in the appended claims.

My invention is illustrated in the accompanying drawings forming a part of this application, in which Figure 1 is a section along the line 1—1 of Figure 2;

Figure 2 is a rear elevation of the device;

Figure 3 is a top plan view of the mechanism; and

Figure 4 is a view similar to Figure 2 but showing the parts in inoperative position and on a reduced scale.

In carrying out my invention, I make use of a standard automobile which has a transmission 1, a rear axle housing 2, a differential housing 3, and rear wheels 4. To the housings 2 and 3 I secure a support 5 that has two side pieces 6 and 7 extending substantially the width of the automobile. The piece 7 is integral with the piece 6, and the latter is secured at 8 to the axle housing 2, and is further secured to the differential housing 3.

Reference to Figure 2 shows how arms 9 and 10 are pivotally mounted between the sides 6 and 7 by means of stub shafts 11 and 12 (see Figure 3). At the free ends of the arms 9 and 10, I mount track-laying members indicated generally at 13 and 14. It is obvious that wheels may be substituted for the members without departing from the spirit and scope of my invention. The members are pivotally secured to the arms 9 and 10 at 15 and 16, and will therefore conform to the surface 17 of the road. In Figure 4 I show the arms in inoperative position. The pivot points 15 and 16 permit the track-laying members to assume the position shown in this figure.

I will now describe the means for lowering the arms 9 and 10 into operative position. In Figure 3 I show a bevel gear 18 as being constantly rotated so long as the engine (not shown) of the automobile is running. This gear is in mesh with a bevel gear 19, which in turn is mounted upon a shaft 20, the shaft carrying a second bevel gear 21 at its opposite end. A standard bevel gear reversing mechanism indicated generally at 22 is mounted upon a shaft 23, and this mechanism connects or disconnects the shaft 23 from the shaft 20, depending upon the position in which the lever 24 (see Figure 1) is disposed. The lever 24 may be swung to the left for rotating the shaft in one direction, or swung to the right for causing the shaft to rotate in the opposite direction. The lever 24 is preferably disposed next to the driver of the automobile and on his left hand side where it may be readily grasped.

The shaft 23 extends back to the support 5 and extends on through the support for a short distance as shown in Figure 3. The shaft is operatively connected to the arms 9 and 10 by a clutch 25 and a sprocket and fan mechanism 26 shown in Figure 2. The clutch 25 when operating rotates a sprocket 27 and moves a chain 28, which is passed over an idler sprocket 29 and has its ends secured at 30 to a link 31 that connects the arms 9 and 10 together. It will be seen from this construction that a rotation of the sprocket 27 in one direction will move the arms 9 and 10 into operative position, and an opposite movement of the sprocket will swing the arms into inoperative position. A spring 32 is connected to the chain 28 as shown in Figure 2 and takes up any slack in the chain.

Some means should be provided for automatically disconnecting the clutch 25 when the arms 9 and 10 are swung into operative position, and also when they are swung into inoperative position. The end of the shaft 11 projecting beyond the side 7 is squared as at 33 (see Figure 2) and carries an L-shaped cam 34. The cam is swung with the arm 9, and one leg 35 of the cam engages with a flange 36 on the sprocket when the arm 9 reaches operative position. The leg 35 has the portion engaging with the flange 36 inclined so as to disconnect the clutch 25 when the arm 9 reaches operative position. This permits the shaft 23 to continue to rotate without swinging the arms 9 and 10 beyond a predetermined point.

When swinging the arms 9 and 10 back into operative position, the clutch 25 is thrown in by means of a fork 37 (see Figure 1) that is connected to a lever 38, this lever being disposed near the lever 24 where it may be operated by the driver. The lever 24 is now actuated so as to rotate the shaft 23 in a counter-clockwise direction, whereupon the arms 9 and 10 will be swung into inoperative position. As soon as the arm is near the position shown in Figure 4, the leg 39 of the cam 34 engages with the flange 36 and opens the clutch 25, thus stopping further movement of the arms.

When the arms are in operative position, the power may be applied to the track-laying members 13 and 14 for causing them to swing the rear end of the automobile in either direction. This is accomplished by means of a clutch 40 (see Figures 1 and 3). This clutch is operated by the lever 38, and when it is thrown in, the clutch 25 is thrown out, and a clutch 41 is thrown in which locks the arms 9 and 10 against movement in either direction. It will be noted from Figure 3 that one part of the clutch 41 is formed on a bracket 42 that is integral with the support 5.

The clutch 40 when in, connects a sprocket 43 with the shaft 23. The shaft 23 may be rotated in either direction, as already stated, and therefore the sprocket wheel 43 will be likewise rotated. A chain 44 connects the sprocket wheel 43 with a sprocket wheel 45 (see Figure 3) that is loosely mounted upon a shaft 11. The sprocket wheel 45 is integral with a sprocket wheel 46, and the latter is connected by means of a chain 47 (see Figure 2) to the track layer 13. It may be seen from this construction that the track layer may be moved in either direction for swinging the rear end of the automobile.

From the foregoing description of the various parts of the device, the operation thereof may be readily understood.

The driver, when approaching a parking space just large enough to receive the length of his car, points the head of the car toward the curb so that the front wheels will be spaced the necessary distance from the curb while the rear wheels will be out a considerable distance. The lever 38 is now moved to the left (shown in Figure 1) for throwing the clutch 25 in. The lever 24 is now moved for causing the shaft 23 to rotate in a clockwise direction. This will swing the arms 9 and 10 down into operative position, and the arms will be automatically disconnected as soon as the leg 35 opens the clutch 25. The lever 38 may now be moved to the right for throwing the clutches 40 and 41 in. It is best to have the lever 24 in neutral position when actuating the lever 38.

The lever 24 is now moved for rotating the shaft 23 in the desired direction, which will cause movement to be imparted to the track layer 13 for swinging the rear end of the automobile toward the curb. The power for moving the track layer 13 is obtained from the engine, and the speed of the engine may be controlled for moving the track layer fast or slow. The arms 9 and 10 are rigidly held in operative position when the clutch 41 is in. It should further be noted that the bearings of the arms fill up the space between the sides 6 and 7 of the support 5. In this way the arms are braced against lateral strains.

The driver in moving the car out from the curb rotates the track-laying members in the opposite direction until the rear end of the automobile extends free of the line of cars or other obstructions. The arms 9 and 10 are then swung into inoperative position, and the driver can then back his car out until he has sufficient room to turn the front wheels to clear the obstruction just ahead.

Although I have shown and described one embodiment of my invention, it is to be understood that the same is susceptible of various changes, and I reserve the right to employ such changes as may come within the scope of the appended claims.

I claim:

1. A parking device for automobiles comprising arms for lifting the rear wheels off from the ground, endless track-laying members carried by said arms, a driving shaft rotatable in either direction, manually-controlled means for operatively connecting said arms with said shaft for swinging them into or out of operative position, and for operatively connecting said track layers to said shaft for moving said track layers in either direction.

2. A parking device for automobiles comprising arms for lifting the rear wheels off from the ground, endless track-laying members carried by said arms, a driving shaft rotatable in either direction, manually-controlled means for operatively connecting said arms with said shaft for swinging them into or out of operative position and for operatively connecting said track layers to said shaft for moving said track layers in either direction, and automatic means for disconnecting said arms from said shaft when said arms reach either operative or inoperative positions.

3. A parking device for automobiles comprising a pair of arms for lifting one end of the car, a driving shaft rotatable in either direction, manually-controlled means for causing said shaft to rotate in the desired direction, a sprocket mounted upon said shaft, a sprocket chain operatively connecting said sprocket with said arms for moving said arms when said sprocket is moved, a spring for taking up slack in the chain, and a manually controlled clutch for connecting said sprocket with said shaft.

4. A parking device for automobiles comprising a pair of arms, endless track-laying members carried by the free ends of said arms, a driving shaft rotatable in either direction, clutches mounted upon said shaft for operatively connecting said arms or said track-laying members to said shaft, and common means for actuating both of said clutches simultaneously.

5. A parking device for automobiles comprising a pair of arms, endless track-laying members, carried by the free ends of said arms, a driving shaft rotatable in either direction, clutches mounted upon said shaft for operatively connecting said arms or said track-laying members to said shaft, common means for actuating both of said clutches simultaneously, and positive means engaging with said arm-actuating clutch for locking said clutch against rotation when said track-laying clutch is in operative position.

6. A parking device for automobiles comprising a pair of arms, track-laying members carried by the free ends of said arms, a driving shaft rotated continuously in one direction, a driven shaft, manually-controlled means for connecting said driven shaft to said driving shaft causing the driven shaft to rotate in either direction, means for swinging said arms, means for actuating said track-laying members, clutches mounted upon said driven shaft for operatively connecting said arm-moving means and said track-laying moving means with said driven shaft, and manually-controlled means for simultaneously actuating both of said clutches.

7. In a parking device for automobiles, a vehicle-lifting frame comprising a pair of arms swingable into a position for lifting the wheels of the vehicle, and a link connecting the free ends of the arms, a pair of sprockets carried by the vehicle, a sprocket chain passed around said sprockets and having its ends connected to said frame at one point, and means for rotating said sprockets for moving said frame.

8. In a parking device for automobiles, a vehicle-lifting frame comprising a pair of arms swingable into a position for lifting the wheels of the vehicle, and a link connecting the free ends of the arms, a pair of sprockets carried by the vehicle, a sprocket chain passed around said sprockets and having its ends connected to said frame at one point, means for rotating said sprockets for moving said frame, and spring means for taking up slack in said chain.

9. In a parking device for automobiles, a vehicle-lifting frame comprising a pair of arms swingable into a position for lifting the wheels of the vehicle, and a link connecting the free ends of the arms, a pair of sprockets carried by the vehicle, a sprocket chain passed around said sprockets and having its ends connected to said frame at one point, means for rotating said sprockets for moving said frame, and positive means for preventing rotation of said sprockets after said frame has been swung into operative position.

10. In a parking device for automobiles, a vehicle-lifting frame secured to the automobile, means for moving said frame, vehicle-moving members carried by said frame, a clutch for each of said means for connecting them to a source of power, and automatic means for stopping the frame-moving means when said vehicle-moving members are being actuated.

PETER JENSEN.